Figure 1:
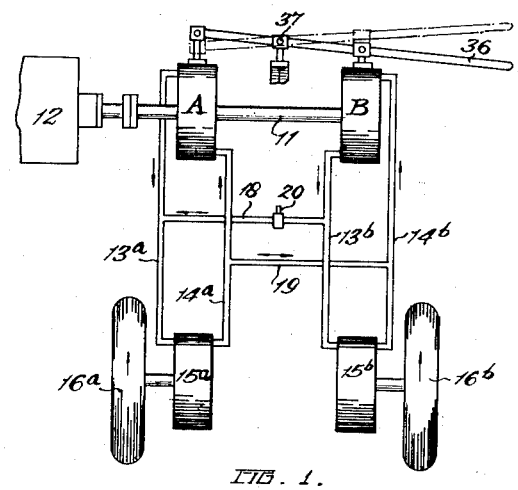

Aug. 27, 1957   R. J. F. MOORE   2,804,016
HYDRAULIC POWER TRANSMISSION SYSTEMS
Filed Aug. 24, 1953   2 Sheets-Sheet 1

INVENTOR:
RAYMOND J. F. MOORE
By: Young, Emery & Thompson
Attys.

Aug. 27, 1957 R. J. F. MOORE 2,804,016
HYDRAULIC POWER TRANSMISSION SYSTEMS
Filed Aug. 24, 1953 2 Sheets-Sheet 2
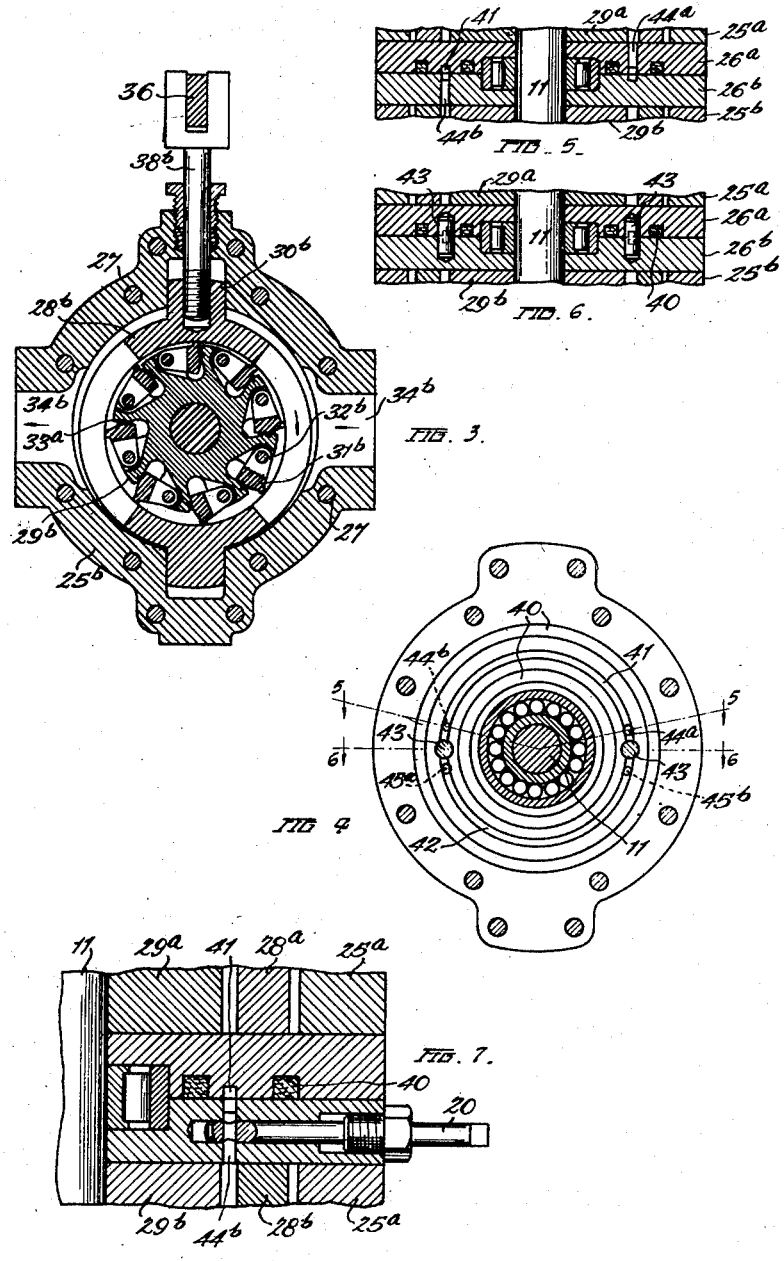
INVENTOR:
RAYMOND J. F. MOORE
By: Young, Emery & Thompson
Attys.

United States Patent Office 2,804,016
Patented Aug. 27, 1957

2,804,016

HYDRAULIC POWER TRANSMISSION SYSTEMS

Raymond John Francis Moore, Armadale, Victoria, Australia

Application August 24, 1953, Serial No. 376,216

Claims priority, application Australia August 25, 1952

5 Claims. (Cl. 103—3)

This invention relates to hydraulic transmission systems and particularly to systems for transmitting power at differential speeds to members, such as the driven road wheels of vehicles.

It is usual to transmit the drive to vehicle road wheels through mechanical differential gearing which enables the wheel or wheels at one side thereof to rotate either more quickly or more slowly than the wheel or wheels at the opposite side but it is well known that such mechanism is subject to the disadvantage that if one wheel is engaging a slippery surface or is otherwise subjected to considerably less resistance than the opposite wheel, the whole motion is transmitted thereto so that the vehicle is immobile.

An object of this invention is to provide a multiple pump comprising a plurality of unit pumps connected by at least one by-pass passage whereby hydraulic motors when connected to respective unit pumps may be driven at differential speeds.

Thus the said by-pass passage is incorporated in the pump assembly as produced for subsequent incorporation in a hydraulic transmission system.

Another object is to provide a multiple pump of the aforesaid kind wherein the said by-pass passage is restricted thereby to produce a significant drop in pressure when the rate of flow of liquid therethrough is a relatively high proportion of the normal delivery rate of a unit pump. Consequently, as the speed of one motor increases relatively to that of another, the torque on the latter is progressively and significantly increased. This is particularly desirable when the motors are used to drive the road wheels of a vehicle so as to prevent a wheel at one side thereof from remaining stationary while a wheel at the opposite side thereof spins on a slippery surface or the like in the manner which is commonly experienced when the usual mechanical differential gearing is used.

Preferably the multiple pump embodies two by-pass passages, one of which interconnects the inlet sides or passages of the unit pumps while the other similarly interconnects the discharge sides or passages thereof.

A further object of the invention is to provide a valve which is operable to close the by-pass passage when desired in order that the motors will be driven independently.

A still further object is to provide an improved construction of multiple pump so as to provide the said by-pass passages in a simple, convenient and effective manner.

For this purpose the coaxially arranged unit pumps are preferably separated by a partition in which the said by-pass passages are formed as hereafter described.

In the following more particular description of the invention, reference is made to the accompanying drawings, in which:

Figure 1 is a diagrammatic plan view of hydraulic transmission mechanism.

Figure 2:
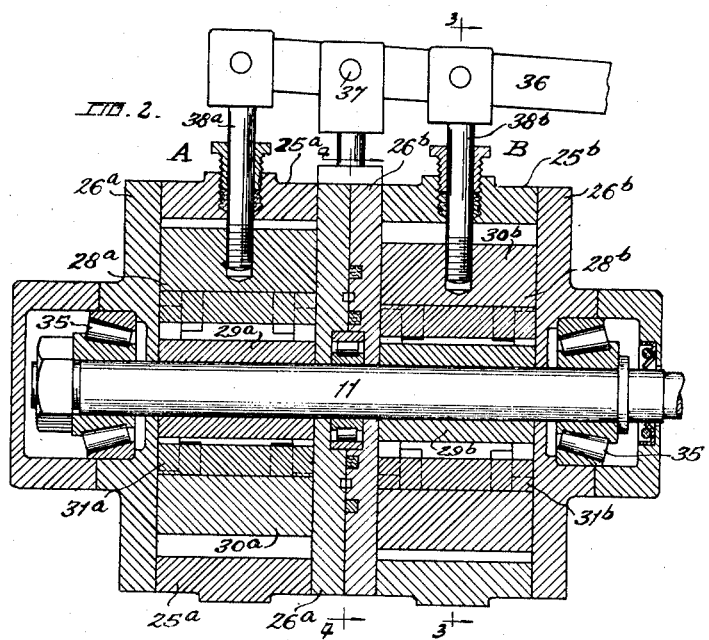

Figure 2 is a view in sectional side elevation of a variable speed multiple hydraulic pump, Figure 3 is a view in sectional end elevation and is taken on the line 3—3 of Figure 2, Figure 4 is a view in sectional end elevation taken on the line 4—4 of Figure 2, Figure 5 is a view in sectional plan taken on the line 5—5 of Figure 4, Figure 6 is a view in sectional plan taken on the line 6—6 of Figure 4, and Figure 7 is a view to a larger scale corresponding to a portion of Figure 5 and shows a modification.

Figure 1 shows diagrammatically a power transmission system for the road wheels of a vehicle. This system comprises a multiple pump of the crescent chamber type embodying two coaxially arranged unit pumps A and B driven by a common spindle 11 which is coupled to the engine 12.

The pump A is connected by delivery and return pipes 13a and 14a respectively to a corresponding hydraulic motor 15a which also is of the rotary crescent chamber type and the rotor of which is secured to the axle of a corresponding road wheel 16a.

Similarly the pump B is connected by delivery and return pipes 13b and 14b respectively to a motor 15b secured to the axle of a road wheel 16b at the opposite side of the vehicle.

The eccentricity of the rotors of the pumps A and B may simultaneously be varied in order that the direction and rate of flow of the liquid may be reversed or varied, while the spindle 11 rotates at a constant speed in one direction as hereafter explained, it being apparent therefore that the so-called delivery and return pipes become the return and delivery pipes respectively when the direction of flow is reversed.

The pumps A and B are identical as are also the motors 15a and 15b so that under normal operating conditions when all of the liquid delivered by each pump passes to the corresponding motor, the road wheels are positively driven at equal speeds.

Now according to the preesnt inventon at least one and preferably two by-pass passages are provided in the pump assembly to permit of differential speeds of the motors driven thereby but in order more clearly to explain the purpose of these passages, they are replaced in Figure 1 by equivalent by-pass pipes 18 and 19 arranged between the pumps and the motors and which respectively connect the delivery pipes 13a and 13b and the return pipes 14a and 14b. It will be clear that these by-pass pipes equalise the liquid pressures in the two systems.

Thus if for example the vehicle is turned to the right, so that the road wheel 16a requires to rotate at a higher speed than road wheel 16b if neither wheel is to slip on the road surface, a proportion of the liquid discharged by the pump B passes from the delivery pipe 13b through the by-pass pipe 18 to the motor 15a and thence from the return pipe 14a through the by-pass pipe 19 to the return pipe 14b of the pump B.

Accordingly, the total body of liquid discharged by the two pumps is distributed between the two motors, so that they are driven at differential speeds, such that equal torques are imparted to the two road wheels as is the case with mechanical differential gearing.

Should one of the road wheels 16a and 16b engage a non-tractive surface while the other wheel engages a tractive surface, the total quantity of liquid delivered by both pumps will pass to the motor of the first-mentioned wheel if the pipes are sufficiently large in diameter. In such a case therefore, the apparatus operates in the same manner as does the usual mechanical differential gearing under the same conditions, that is to say, the one wheel will remain stationary, while the other is driven at twice the normal speed.

Preferably, however, at least one of the by-pass passages 18 and 19 is sufficiently small in diameter or is formed with a restriction so as to offer a considerable resistance to the flow of liquid at high velocity therethrough while offering but little resistance when the velocity is low.

When a vehicle is executing a normal turn, the ratio of the speeds of the two wheels is generally small, so that the velocity of the oil or other liquid through the by-pass pipes is low, so that the required differential effect is obtained as above described.

As this ratio increases the rate of flow of the oil through the by-pass pipes is correspondingly increased until in the limiting case, all of the oil delivered by one of the pumps passes through the by-pass. However, as the velocity of the oil increases, the pressure drop across the restricted by-pass pipe is increased, so that the torque on the stationary motor also increases.

Consequently, if the by-pass is sufficiently restricted the torque on the stationary motor will be increased sufficiently to turn the stationary wheel.

Alternatively, or in addition, one at least of the by-pass pipes may be provided with a valve 20 which may be operated either manually or automatically so as further to restrict the flow of oil therethrough or to prevent such flow entirely. It will be evident that when this valve is closed, the oil discharged by each pump necessarily passes to the corresponding motor, so that the two wheels are positively driven at equal speeds.

One preferred construction of duplex pump embodying the invention is shown in Figures 2 to 6 inclusive in which two rotary crescent chamber pumps generally designated A and B respectively are arranged coaxially and are provided with a common driving shaft 11.

The two pumps are identical in construction so that it is sufficient to describe one of them and the component parts thereof are designated in the drawings by the same reference numerals which are distinguished by the suffixes *a* and *b* for the pumps A and B respectively.

Thus the pump A has an outer casing 25a in the form of an annulus which is open at each end and is fitted with end plates 26a, such members of the two pumps being clamped together by bolts 27. Thus the adjacent pair of plates 26a and 26b constitute a composite partition between the two pumps.

A cylinder 28a in the form of a ring is arranged within the casing 25a with its ends disposed in sealing contact with the respective end plates 26a while a rotor 29a secured to the spindle 11 is arranged within the cylinder.

The cylinder 28a is slidable in its own plane within the casing 25a and in the direction permitted by a diametrically opposed pair of radial guide projections 30a which are neatly received within corresponding pockets in the inner periphery of the casing 25a.

The path of permitted movement of the centre of the cylinder passes through the axis of the spindle 11 so that the cylinder may be disposed concentrically about the rotor 29a or may be disposed eccentrically with its centre disposed at either side of the axis of the rotor and on a particular diameter thereof.

The rotor is provided with a plurality of depressible impellers which are arranged at equal angular spacings and which project outwardly therefrom to engage the periphery of the cylinder. These impellers may be of any suitable type but are preferably of the type shown in Figure 3.

Each of these impellers 31a is formed with arms which are pivoted at 32a to the rotor and the outer face thereof is of arcuate form with its centre of curvature coinciding with the pivotal axis. A fluid-tight seal is maintained between this arcuate face and the rotor by means of a sealing strip 33a on the latter for which purpose the said arcuate face is conveniently termed the rotor sealing face.

The outer end of each impeller is formed with an extension which bears against the periphery of the cylinder and the outer face of which is termed the cylinder sealing face. Preferably the extended arc of the arcuate rotor sealing face passes through the cylinder sealing face in order that the pressure of the liquid will at all times tend to maintain the impeller in contact with the cylinder.

Normally the cylinder is disposed eccentrically with respect to the rotor as shown in Figure 3 and it will be evident from this figure that if the spindle 11 is turned clockwise with the cylinder in the illustrated position, the oil or other liquid will pass from right to left through the pump as shown by the arrows in the diametrically opposed pair of inlet and outlet passages 34b in the casing 25b.

If the cylinder 28b were displaced so that its axis was disposed above instead of below the rotor axis, it will be apparent that the liquid would be pumped in the opposite direction, i. e. from left to right so that a rotary motor connected in circuit therewith would be driven in the opposite direction. Finally, when the cylinder is concentric with the rotor, the liquid is not pumped in either direction but is merely circulated within the pump cylinder.

Preferably the cylinders 28a and 28b have equal and opposite eccentricities at all times as shown so as to reduce the load on the bearings 35 of the spindle 11.

For this purpose it is necessary to adjust the cylinders simultaneously in opposite directions and one suitable manner of obtaining this result is shown in Figure 2 wherein a rocking lever 36 pivoted at 37 to a fixed support between the pumps is pivotally connected on opposite sides of the pivot pin 37 to rods 38a and 38b which are secured to the respective cylinders 25a and 25b and which extend slidably through sealing glands in the pump casings.

Thus the liquid is at all times pumped in opposite directions through the two pumps, so that the inlet and discharge ports of one pump are disposed in opposition to the discharge and inlet ports respectively of the other pump.

The by-pass passages which as explained with reference to Figure 1 are provided in order to permit of differential motion of the motors to be connected in circuit with the pumps are formed in the abutting end plates 26a and 26b arranged between the two pump chambers.

Thus as shown in Figures 2, 4, 5 and 6, the inner contacting faces of these intermediate end plates 26a and 26b are each formed with a concentric annular groove, the two grooves being equal in diameter so that when the plates are clamped together, they form a closed annular passage which is arranged between two concentric sealing rings 40. The said annular passage is subdivided into a diametrically opposed pair of semi-circular passages 41 and 42 by means of a diametrically opposed pair of plugs 43 which are received within corresponding holes in the said end plates and which prevent the passage of oil from either of said semi-circular passages to the other.

The said plugs 43 are disposed adjacent to the inlet and discharge chambers of the two pumps so that the opposite ends of each of said semi-circular passages are likewise disposed adjacent to such chambers.

One end portion of the semi-circular passage 41 is connected by a passage 44a formed transversely in the end plate 26a to the adjacent portion of the interior of the cylinder 28a while the opposite end portion of the said semi-circular passage is similarly connected by a transverse hole 44b in the end plate 26b to the adjacent portion of the interior of the cylinder 28b.

Similarly that end of the second semi-circular passage 42 which is disposed adjacent to the hole 44b is connected by a transverse hole 45a formed in the end plate 26a to the interior of the adjacent portion of the cylinder 28a, while the opposite end thereof is connected by a hole 45b to the interior of cylinder 28b.

Thus the inlet and discharge chambers of the pump A are permanently connected by the semi-circular by-pass passages 41 and 42 to the corresponding chambers of the pump B each of the last mentioned chambers being disposed diametrically opposite to the respective chambers of the pump A.

It will be apparent therefore that if each of the pumps is connected to a corresponding motor as shown diagrammatically in Figure 1, the semi-circular by-pass passages serve as do the by-pass pipes 18 and 19 of Figure 1, to permit of differential motion of the motors.

When it is desired to provide means for preventing the flow of liquid through the by-pass passages, a valve 20 may be arranged as shown in Figure 7, in one of said passages or two such valves may be provided—one in each of the said passages. Each of these valves may be employed either to restrict or prevent the by-pass of liquid according to whether the valve is partly or wholly closed and it will be evident that if desired equivalent valves capable of being automatically operated may be used. For example, means responsive to the drop in pressure across the pumps may be arranged to close the by-pass valve when due to the reduction in the load on either motor, the pressure drop falls to a predetermined low value.

In some cases it might be desired to permit one particular motor to operate more quickly than the other and it will be evident that this result could be obtained by providing a non-return valve in one of the by-pass passages so that liquid can flow therethrough in one direction only. Similarly two non-return valves permitting flow in opposite directions could be arranged in parallel and shut-off valves could be associated therewith, so that either of said non-return valves would become ineffective in order that either motor could be permitted to operate faster than the other but not vice versa, according to requirements.

The said rotary hydraulic motors may be of any suitable positive displacement type but same are preferably of the crescent chamber type and preferably embody rotors provided with pivoted impellers similar to the impellers of the pumps described herein.

Finally and referring again to Figure 2, it will be evident that any desired number of pumps similar to A and B may be arranged coaxially, with each adjacent pair thereof connected by by-pass passages for the purpose described.

I claim:

1. A multiple pump of the crescent chamber type for use in power transmission systems comprising at least two coaxially arranged unit pumps, each unit pump having an inlet and an outlet, a common driving spindle and means operable to adjust the said unit pumps in unison thereby simultaneously to increase or simultaneously to decrease the eccentricity thereof and a common partition means between the unit pumps, the said partition means being formed with a first by-pass passage which connects the inlet sides of the unit pumps and with a second by-pass passage which similarly connects the discharge sides of the unit pumps and one at least of the by-pass passages having restricting means therein whereby a substantial drop of pressure will be produced therein when the rate of flow of liquid therethrough is a relatively high proportion of the normal delivery rate of either of the unit pumps.

2. A multiple pump of the crescent chamber type for use in power transmission systems comprising at least two coaxially arranged unit pumps having diametrically opposite directions of eccentricity, each unit pump having an inlet and an outlet, a common driving spindle for the unit pumps and means operable to adjust the unit pumps in unison thereby simultaneously to increase or simultaneously to decrease the eccentricity thereof, the last-mentioned means being operable also to reverse in unison the directions of eccentricity of the unit pumps and including, common partition means between the unit pumps, the said partition means being formed with a first by-pass passage with connects the inlet sides of the unit pumps and with a second by-pass passage which similarly connects the discharge sides thereof and a valve operable to restrict or close one of the said by-pass passages.

3. A multiple pump of the crescent chamber type for use in power transmission systems, comprising casing means, at least two unit pumps enclosed within the casing means and a common drive spindle for the unit pumps, each unit pump having an inlet and an outlet comprising an open-ended cylinder arranged within a corresponding chamber in the casing means, and a rotor secured to the spindle within the cylinder; common partition means separating the adjacent chambers and closing the corresponding ends of the cylinders, the said cylinders having diametrically opposite directions of eccentricity and each cylinder being adjustable by sliding it diametrically within the casing means from a limiting position on one side of the rotor axis to a limiting position on the opposite side thereof and including means operable to adjust the cylinders simultaneously and in opposite directions to vary the eccentricity thereof and characterised in that the said common partition means is formed with a first by-pass passage which connects the inlet sides of the unit pumps and with a second by-pass passage which similarly connects the discharge sides of the unit pumps, one at least of the said by-pass passages having restricting means therein, thereby to produce a significant drop in pressure when the rate of flow of the liquid therethrough is a relatively high proportion of the normal delivery rate of a unit pump.

4. A multiple pump of the crescent chamber type for use in power transmission systems comprising at least two coaxially arranged unit pumps and a common driving spindle therefor, each unit pump comprising a casing having an inlet and an outlet, an open-ended cylinder enclosed within and having its ends closed by the corresponding ends of the casing and a rotor within the cylinder and secured to the spindle; means securing the casings together with the outer faces of adjacent ends thereof in abutting contact, the cylinders having diametrically opposite directions of eccentricity and each cylinder being adjustable by sliding it diametrically within its respective casing from a limiting position on one side of the rotor axis to a limiting position on the opposite side thereof and including means operable to adjust the cylinders simultaneously in opposite directions thereby to vary the eccentricity thereof and characterised in that the abutting ends of the casings of the unit pumps are formed with a first by-pass passage which connects the inlet sides of the unit pumps and with a second by-pass passage which similarly connects the discharge sides thereof, a portion of each of the said by-pass passages being formed by a corresponding groove in the outer face of one at least of the said abutting ends of the casings and a valve operable to restrict or close one of the said by-pass passages.

5. A multiple pump of the crescent chamber type for use in power transmission system comprising at least two coaxially arranged unit pumps and a common driving spindle therefor, each unit pump comprising a casing having an inlet and an outlet, an open-ended cylinder enclosed within and having its ends closed by the corresponding ends of the casing and a rotor within the cylinder and secured to the spindle; means securing the casings together with the outer faces of adjacent ends thereof in abutting contact, the cylinders having diametrically opposite directions of eccentricity and each cylinder being adjustable by sliding it diametrically within its respective casing from a limiting position on one side of the rotor axis to a limiting position on the opposite side thereof and including means operable to adjust the cylinders simultaneously in opposite directions thereby to vary the eccentricity thereof, and characterised in that the abutting ends of the casings of the unit pumps are formed with a first by-pass passage which connects the inlet sides of the unit pumps and with a second by-pass passage which similarly connects the discharge sides thereof, a portion of each of the said by-pass passages being formed by a corresponding one of two diametrically opposed semi-circular grooves in the outer face of one at least of the abutting ends of the casings, and a valve member extending radially into one of the said abutting end members, the said valve being operable to restrict or close one of the said by-pass passages.

References Cited in the file of this patent

UNITED STATES PATENTS

| | | |
|---|---|---|
| 550,466 | Westinghouse | Nov. 26, 1895 |
| 1,179,736 | Manly | Apr. 18, 1916 |
| 1,900,050 | Ernst | Mar. 7, 1933 |
| 1,988,213 | Ott | Jan. 15, 1935 |
| 2,490,115 | Clarke | Dec. 6, 1949 |
| 2,513,446 | Brown | July 4, 1950 |
| 2,570,411 | Vickers | Oct. 9, 1951 |